May 16, 1967 W. P. SCHULZ 3,320,114

METHOD FOR LOWERING INDEX OF REFRACTION OF GLASS SURFACES

Filed July 31, 1963

INVENTOR:
Werner P. Schulz
By Richard Zentner
Agent 3,320,114
METHOD FOR LOWERING INDEX OF REFRACTION OF GLASS SURFACES
Werner P. Schulz, San Bruno, Calif., assignor to Litton Precision Products, Inc., San Carlos, Calif.
Filed July 31, 1963, Ser. No. 298,980
7 Claims. (Cl. 161—175)

This invention relates to optical systems, and has for its principal objects improvement and simplification of the production of optical systems, and fiber optics in particular. More specifically, the invention is concerned with fiber optic techniques including a method for preparing optical fibers for fiber optic devices.

It is known that light rays can be guided in thin glass rods or filaments, generally termed optical fibers, in any desired path if the fiber of glass of a specific index of refraction is surrounded by a medium of lower index of refraction, such as air. In order to transmit an image or a pattern, bundles composed of a multitude of individual fibers have often been used. Each fiber includes a high refractive index core coated with a very thin layer of lower refractive index material. It is well known that light follows a zigzag path down the fiber since it is repeatedly reflected at the interface between the two transparent media back into the core of higher index of refraction, provided the angle of incidence is less than the "critical angle." This critical angle is determined by the ratio of indices of refraction, so that the necessary conditions are readily met with thin fibers, such as fused silica fibers coated with glass of significantly lower refractive index than that of the silica fiber core.

Although fiber optics made of transparent plastic have been suggested, the standard materials generally used are silica compositions, i.e. glass and fused silica. For practical purposes, a very great number of these extremely fine optical fibers is necessary, usually in a parallel arrangement, to form a high resolution light channel, because the number of individual fibers per unit cross sectional area determines the resolution of the optical system. Such optical system may be the faceplate of a cathode ray tube oscillograph, a television tube, or a display tube, in all of which a scanning beam sweeps over the inside of the faceplate which is coated with phosphor material. The light produced by the phosphor, when excited by the electron beam, is guided outwardly by the individual fibers through the faceplate. High resolution and critical angle of total reflection are achieved by maintaining the individual optical fiber, including the core and its outer layer of low refractive index material, within a range of diameter of about 250,000 to 750,000 angstroms. It will be apparent that applying a coating of about 3,000 to 4,000 angstroms to a fiber of about this cross sectional size poses a serious problem. Generally, glass fibers having a cross section exceeding the desired cross section and having about the same or higher melting point are pulled through a molten glass mass, and the coated fiber is drawn through wire drawing dies until the total cross section is reduced to the desired value. In accordance with another conventional method, a glass tube and a glass core, also of identical or higher melting point, positioned inside the tube are heated to softening temperature and drawn simultaneously until the desired cross sectional dimension is obtained. Both methods, and other processes developed in the past for producing optical fibers, are comparatively complicated and time consuming. They require the employment of skilled help, expensive machinery and have the serious shortcoming of a high percentage of rejects in the form of imperfect fibers unsuitable for use in optical systems.

In accordance with one underlying principle of the invention, it was found that it is possible to modify the index of refraction of siliceous material by surface treatments in which foreign matter is introduced into at least a portion of its surface, thereby changing the index of refraction of the treated surface portion. In other words, instead of adding material of different index, the invention produces the result by modification in situ of a portion of the surface. In practice, and referring to a piece of siliceous material of any desired shape, the surface which it is intended to exhibit a refractive index different from that of the remaining body is subjected to a treatment which introduces into it compounds of the type generally used in the manufacture of glass. From a general point of view, and especially when small quantities are involved, and further since a great number of elements or compounds such as oxides, will result in the desired effect, they may properly be termed "glassy impurities," this term referring to small quantities of those substances which determine the properties of the resulting glass and are used as an addition to quartz sand in the conventional manufacture of glass, and provided these quantities are sufficient to lower the index of refraction to an extent necessary for internal reflection.

The optical element contemplated herein may be a lens, lens system or a prism, for example. In the case of a prism, it might be one or more of its planar surfaces which must reflect light incident under an angle below a predetermined incident angle. However, the invention is mainly concerned with, but not restricted to the manufacture of optical fibers and, therefore, the following description deals with such fibers exclusively.

In fiber optics, the internal portion or core must have a higher index of refraction in order to obtain the channeling effect on light. Thus, the starting material will be siliceous material of high refractive index, quartz fiber or any other similar glass composition. In accordance with an essential feature of the invention, the fiber is contacted with one or more of the many compounds or substances used as an addition to quartz sand in the conventional manufacture of glass, such as an alkali compound, a chloride, for example, or other element or oxide, and subjected to a firing step until a surface layer of the quartz or glass fiber is converted in situ into glass. Most elements and oxides employed in the glass manufacturing industry lend themselves to the transformation of the surface of the fiber material as long as the produced outside coating exhibits a lower index of refraction. After cooling, an optical fiber of a cross section substantially the same as that of the initial quartz or glass fiber is obtained. A plurality of fibers may be combined into a bundle under heat and pressure, and employed in optical systems as is known in the art.

The novel features which are believed to be characteristic of the invention, both as to its organization and methods of operation, together with further objects and advantages thereof, will be better understood from the following description considered in connection with the accompanying drawing in which one embodiment of the invention is illustrated by way of example. It is to be expressly understood, however, that the drawing is for the purpose of illustration and description only, and is not intended as a definition of the limits of the invention.

Figure 1:
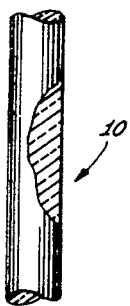
FIG. 1 illustrates a fused silica fiber before treatment.

Referring now to FIG. 1 of the drawing, a fiber 10 of siliceous material having a high refractive index may be used. Good results have been obtained when using fused silica fibers, and especially as obtained directly from a melting furnace because of the high degree of purity of the surface of the fiber. Lead glass, or any other high refractive index glass may also be employed.

Figure 2:
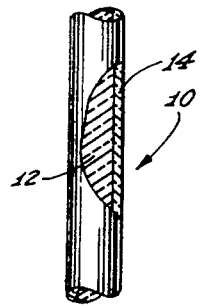
FIG. 2 is an illustration of the same fiber having a surface layer transformed into glass, in accordance with the invention.

FIG. 2 is a view in partial cross section of the finished fiber, illustrating that this fiber is an optical fiber having a core 12 of unchanged starting material, which may be fused silica as discussed above, and an outer layer 14. It will be observed that the finished fiber of FIG. 2 has substantially the same diameter as the silica fiber of FIG. 1, due to the fact that the outer portion of the fiber 10 of FIG. 1 has been transformed, or modified, by in situ treatment to form the glass layer of FIG. 2. In practice the diameter of the fiber as a whole may be within the range of 250,000 to 750,000 angstrom units, with the low refractive index material layer 14 of FIG. 2 being 3,000 to 4,000 angstrom units thick.

Figure 3:
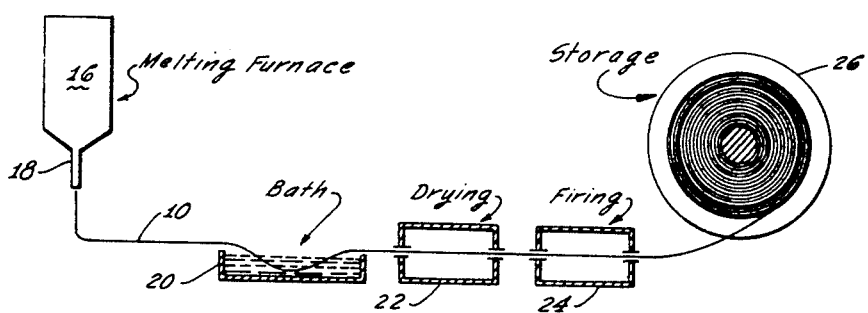
FIG. 3 is a schematic diagram of a continuous process in accordance with the invention.

In FIG. 3, a continuous process for producing optical fibers is shown in a schematic diagram illustrating the different steps involved. A melting furnace of any known type, designated 16, may be used for producing a fused silica mass which is extruded through a spinning nozzle 18 to form the fiber 10. The extruded fiber is passed through a bath 20 of a solution of one or more of those substances which are well known in the manufacture of glass. Even though a great number of compounds exists from which a selection may be made, a desirable compound suitable for a given purpose is readily determined. Since a low refractive index as compared to that of pure fused silica is highly desirable when producing optical fibers, a compound of a light element such as an alkali may be preferred, lithium for example, and in one illustrative example the bath solution 20 included a solution of lithium chloride in de-ionized water. The addition of a wetting agent such as magnesium lauryl sulfate has been found advantageous, and further additions controlling the properties of the glass formed and resulting in a more complex type of glass may be found desirable.

In the specific example mentioned above, 25 ml. of the lithium chloride solution in 40 ml. of de-ionized water were added with 50 mg. of magnesium lauryl sulfate, 500 mg. of cerous chloride ($CeCl_3 \cdot 7H_2O$) and 500 mg. boric acid. The addition of cerium and/or zirconium, suitably in the form of a salt, contributes to the activity of the solution with respect to reaction speed and duration, and the presence of boric acid results in a lower melting point of the layer, to facilitate further processing by sintering fibers together to form bundles.

The subsequent step is passing the fiber 10 through a drying zone 22, suitably maintained at a temperature of about 400° to 500° C. There, the water is evaporated and a deposit of the ingredients is formed on the fiber surface. It will be noted that the wetting agent present in the solution contributes to the build-up of an even layer as the continuous fiber is passed through the bath.

In the next step, the coated fiber is subjected to high temperatures in the range of about 600° to 1500° C., to produce a firing effect by reacting the coating with the underlying fiber surface. Thus, a lower refractive index glass is formed in situ in this firing step. It will be noted that the magnesium present as magnesium lauryl sulfate, mentioned above as the wetting agent, can be assumed to react also so that a magnesium-lithium-cerium-boron-glass is probably formed. Each of the additions, separately or in combination, operates to lower the index of refraction of the fused silica fiber.

Referring to FIG. 3, the apparatus in which the firing step is conducted, designated 24, may be an induction furnace or a microwave oven. Alternatively, heating by radiation or any other method may be employed. The finished optical fiber may be wound on a storage bobbin 26, until it is further processed.

It has been state above that optical fibers of the type under consideration and for purposes of use in cathode ray tube faceplates, for example, have preferably a diameter of 250,000 to 750,000 angstroms. It will be appreciated that smaller diameter fibers may be coated in situ, down to diameters of about 5,000 angstrom but conventional drawing methods fail to produce such very thin fibers. In the illustrative embodiment, a fused silica fiber having a diameter of 500,000 angstrom units was transformed into an optical fiber of which the unchanged silica core had a diameter of about 470,000 angstrom units, coated with a composite lithium glass layer of about 3,000 angstrom units thickness. Generally speaking, the formation of glass layers from about 3,000 to 4,000 is believed to give optimum results in optical systems. The desired thickness of the glass layer formed in situ may be controlled by regulating the concentration of the solution deposited on the fiber when it passes the bath 20. Also, efficient control may be obtained by correctly timing the firing step. In other words, the interval within which one point on the fiber passes through the firing zone 24, and the firing temperature, both determine the depth to which in situ formation of glass occurs, for a given concentration and composition of the solution 20.

It is of interest to note that, when a pure fused silica fiber is treated in the manner described, the concentration of the glass-forming compounds decreases at least to some extent from the outermost surface toward the remaining, unchanged silica core. In other words, the concentration of for example lithium glass is somewhat greater outside than inside the formed glass layer. It would appear that this fact could result in a fiber having no properties of internal reflection, or at least not to a degree sufficient for practical purposes. A number of persons skilled in the art expressed this view. Surprisingly, however, it has been shown by tests that fibers prepared in accordance with the invention are in no way inferior to those produced by prior methods.

In such a test, two strands of fused silica fibers, index of refraction 1.45, one composed of fibers coated in accordance with the invention and the other uncoated, were illuminated at one end. Both strands were bent, and transmission of light through them was observed when the strands were surrounded by air, index of refraction 1.00. Upon immersion of both bent strands in 1,1,2,2-tetrachloroethane, refractive index 1.51, only the strand of coated fibers transmitted light. Therefore, it is concluded that the fibers treated in accordance with the invention had formed on their surface a layer of low index of refraction so that they exhibited true fiber optic properties.

It is to be understood that the above-described arrangements are illustrative of the application of the principles of the invention. Numerous other arrangements may be devised by those skilled in the art without departing from the spirit and scope of the invention. Thus, by way of example and not of limitation, the process may be conducted in separate steps instead of the continuous method shown and described in connection with FIG. 3. It has been mentioned above that a great number of compounds may be used to modify the refractive index of a siliceous body of fiber surface, and the solvent in bath 20 will be selected in accordance with the nature of the compound or compounds, i.e. it must not be water. While the description of the process disclosed herein deals with a fused silica fiber as the starting material, a fiber of any high refractive index siliceous material may be used, regardless of the shape of the fiber cross section, and, as stated above, it must not be a fiber, since the method of the invention is also applicable to pieces or bodies of any desired shape such as prisms, useful in optical systems, for selectively reducing the index of refraction of a portion of their surface.

Accordingly, from the foregoing remarks, it is to be understood that the present invention is to be limited only by the spirit and scope of the appended claims.

What is claimed is:

1. A method for preparing an optical fiber which comprises treating a substantially pure fused silica fiber having a thickness from about 250,000 to 750,000 angstrom units with an aqueous chloride solution selected from the group of alkali and earth alkali chlorides in admixture with a wetting agent, drying the treated fiber to form a chloride coating on the fiber surface, and firing the coated fiber at a temperature sufficient to cause in situ reaction of the chloride coating with the pure silica fiber to a depth of about 3,000 to 4,000 angstroms for producing a glass layer having an index of refraction different from pure silica.

2. A method according to claim 1, in which the wetting agent is magnesium lauryl sulfate.

3. A method according to claim 1, in which the solution includes cerous chloride.

4. A method according to claim 1, in which the solution includes boric acid.

5. A continuous method for converting a silica fiber into an optical fiber, which comprises passing the silica fiber through a bath composed of 40 ml. of a concentrated solution of lithium chloride, 500 mg. of cerous chloride and 500 mg. of boric acid dissolved in 25 ml. of water, passing the fiber through a first zone maintained at a temperature of the range from about 400° C. to 500° C. for drying the solution to deposit a coating on the fiber, passing the coated fiber through a second zone maintained at a temperature sufficiently high to cause an in situ reaction between the solution and the silica fiber to a depth of 3,000 to 4,000 angstroms for producing a layer of glass having an index of refraction different from the refractive index of silica, and removing the fiber from the second zone when the in situ reaction is completed.

6. An optical fiber prepared in accordance with the method set forth in claim 1.

7. An optical fiber prepared in accordance with the method set forth in claim 5.

References Cited by the Examiner

UNITED STATES PATENTS

| | | |
|---|---|---|
| 2,026,086 | 12/1935 | Farncomb. |
| 2,245,783 | 6/1941 | Hyde _____ 65—3 X |
| 2,584,763 | 2/1952 | Waggoner _____ 65—3 X |
| 2,699,415 | 1/1955 | Nachtman _____ 65—3 X |
| 2,761,797 | 9/1956 | Young. |
| 2,779,136 | 1/1957 | Hood et al. |
| 2,979,632 | 4/1961 | MacNeille. |
| 2,998,675 | 9/1961 | Olcott et al. |
| 3,000,761 | 9/1961 | Levi _____ 65—30 X |
| 3,002,857 | 10/1961 | Stalego _____ 65—3 X |
| 3,033,071 | 5/1962 | Hicks. |
| 3,033,731 | 5/1962 | Cole. |
| 3,176,575 | 4/1965 | Socha. |

DONALL H. SYLVESTER, *Primary Examiner.*

F. W. MIGA, *Assistant Examiner.*